United States Patent
Koizumi et al.

(10) Patent No.: US 7,429,764 B2
(45) Date of Patent: Sep. 30, 2008

(54) SIGNAL PROCESSING DEVICE AND IMAGE PICKUP APPARATUS USING THE SAME

(75) Inventors: Toru Koizumi, Kanagawa (JP); Katsuhito Sakurai, Tokyo (JP); Hiroki Hiyama, Kanagawa (JP); Masaru Fujimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 10/373,039

(22) Filed: Feb. 26, 2003

(65) Prior Publication Data
US 2003/0164887 A1    Sep. 4, 2003

(30) Foreign Application Priority Data
Feb. 27, 2002    (JP)    ............... 2002-051822

(51) Int. Cl.
*H01L 31/062*    (2006.01)
*H01L 31/113*    (2006.01)

(52) U.S. Cl. ............... 257/292; 257/239; 257/291; 257/296; 257/298; 257/E31.003; 257/E31.032; 257/E31.112

(58) Field of Classification Search ............... 257/239, 257/291, 292, E31.003, E31.032, E31.112
See application file for complete search history.

(56) References Cited

U.S. PATENT DOCUMENTS

| | | | | |
|---|---|---|---|---|
| RE31,612 E | * | 6/1984 | Sauer | ............... 377/63 |
| 4,528,684 A | * | 7/1985 | Iida et al. | ............... 377/60 |
| 5,029,190 A | * | 7/1991 | Narabu et al. | ............... 377/60 |
| 5,173,757 A | * | 12/1992 | Miwada | ............... 257/215 |
| 5,220,185 A | * | 6/1993 | Wada | ............... 257/239 |
| 5,336,910 A | * | 8/1994 | Murakami | ............... 257/239 |
| 5,698,892 A | | 12/1997 | Koizumi et al. | |

(Continued)

FOREIGN PATENT DOCUMENTS

JP    62-126653 A    6/1987

(Continued)

OTHER PUBLICATIONS

The Examiner's attention is also directed to the following U.S. Appl. No. 09/678,296, filed Oct. 3, 2000.

(Continued)

*Primary Examiner*—Ngan Ngo
(74) *Attorney, Agent, or Firm*—Fitzpatrick, Cella, Harper & Scinto

(57) ABSTRACT

A signal processing device is provided which is capable of suppressing a voltage change of a power supply when output signals from a plurality of signal sources are read, and capable of outputting a stable signal at a high sensitivity, and an image pickup apparatus using such a signal processing device is also provided. The signal processing device has: a plurality of terminals connectable to a plurality of signal sources; and a read circuit for converting signals input from the terminals into serial signals and outputting the serial signals, wherein: the read circuit comprises a holding capacitor connected to each of the terminals, a transfer switch for transferring a signal held in the holding capacitor to a common signal line, and a shift register for driving the transfer switch; and a semiconductor layer under the common signal line has a conductivity type opposite to a first conductivity type of a semiconductor substrate.

22 Claims, 13 Drawing Sheets

U.S. PATENT DOCUMENTS

| | | | | |
|---|---|---|---|---|
| 5,717,458 | A * | 2/1998 | Yonemoto | 348/305 |
| 5,818,075 | A * | 10/1998 | Kawamoto et al. | 257/239 |
| 6,023,293 | A * | 2/2000 | Watanabe et al. | 348/294 |
| 6,091,793 | A * | 7/2000 | Kamashita | 377/60 |
| 6,140,630 | A * | 10/2000 | Rhodes | 250/208.1 |
| 6,188,094 | B1 | 2/2001 | Kochi et al. | |
| 6,191,440 | B1 * | 2/2001 | Mutoh et al. | 257/239 |
| 6,201,268 | B1 * | 3/2001 | Nakashiba | 257/239 |
| 6,420,738 | B1 * | 7/2002 | Kimura | 257/223 |
| 6,512,254 | B2 * | 1/2003 | Yoshihara | 257/223 |
| 6,518,607 | B2 * | 2/2003 | Hynecek | 257/239 |
| 6,670,990 | B1 | 12/2003 | Kochi et al. | |
| 6,791,614 | B1 * | 9/2004 | Kimura | 348/323 |
| 6,960,751 | B2 | 11/2005 | Hiyama et al. | |
| 2001/0012133 | A1 | 8/2001 | Yoneda et al. | |
| 2002/0163020 | A1 * | 11/2002 | Rhodes et al. | 257/239 |

FOREIGN PATENT DOCUMENTS

| | | |
|---|---|---|
| JP | 01-260842 A | 10/1989 |
| JP | 10-229182 A | 8/1998 |

OTHER PUBLICATIONS

Japanese Official Letter issued on Jan. 9, 2007 in counterpart application 2003-045869 and partial translation.

* cited by examiner

SIGNAL PROCESSING DEVICE AND IMAGE PICKUP APPARATUS USING THE SAME

BACKGROUND OF THE INVENTION

1. Field of the Invention

The present invention relates to a signal processing device having a circuit portion of temporarily storing a plurality of output signals and then reading the stored signals and to an image pickup apparatus using such a device.

2. Description of the Related Art

FIG. 13 is a circuit diagram of an image pickup apparatus utilizing a signal processing device having a conventional structure.

In a conventional line sensor or area sensor, output signals from pixels 1001 are once held in holding capacitors 1003 via vertical output lines 1002, thereafter, the output signals held in the holding capacitors are sequentially read to a horizontal common signal line 1005 by a horizontal scanning circuit 1004, and output to a common read amplifier 1007.

An output from the holding capacitor 1003 to the horizontal common signal line 1005 is determined by a capacitor division of a capacitance CT of the holding capacitor 1003 and a horizontal common signal line capacitance Ch 1006 constituted of a parasitic capacitance and the like of the horizontal common signal line 1005.

Namely, by representing a reset voltage of the horizontal common signal line 1005 by Vchr and a voltage across the holding capacitor 1006 by Vsig+Vchr, a voltage output to the horizontal common signal line 1005 is given by the following equation:

$$V = \frac{Ct \times (Vsig + Vchr) + Ch \times Vchr}{(Ct + Ch)} = \frac{Ct \times Vsig}{(Ct + Ch)} + Vchr \quad (1)$$

As shown, a read gain of an optical signal is given by CT(CT+Ch).

The horizontal common signal line capacitance Ch 1006 is constituted of its wiring line capacitance Ch_l and a source-drain capacitance Ch_j of switches connected to the wiring line. Because a recent solid state image pickup apparatus has a number of pixels and a large panel, there is a tendency of an increase in the Ch capacitance, such as an increase in the source-drain capacitance and an increase in the long wiring line capacitance.

For example, in a large panel sensor of a film size recently paid attention, the length of the horizontal common signal line is about 20 mm. In this case, the wiring line capacitance Ch_l becomes as large as 5 pF and the source-drain capacitance Ch_j becomes as large as 12 pF.

Assuming that the CT capacitance is 5 pF, the read gain of an optical signal is 0.23.

The number of stages of the horizontal scanning circuit 1004 increases as a number of pixels are used. In addition, if the read frame rate is not changed, the data rate, i.e., an operation frequency, becomes high. By representing the number of pixels by N, the number of stages increases in proportion to a root of N and the operation frequency becomes high in proportion to N. Therefore, a consumption power is given by:

$$P = N^{3/2} \times CO \times V^2 \times F$$

where N is the number of pixels, CO is a constant, V is a power supply voltage and F is a frame rate.

Each time a drive pulse is applied to the horizontal scanning circuit 1004, a large current flows through the horizontal scanning circuit 1004 and a large clock noise is generated. In some cases, this clock noise is superposed upon an output from the read common amplifier and the incorrect output is obtained. Shading may also occur because of this clock noise. Such a phenomenon becomes conspicuous on a large panel, mega-pixel solid state image pickup apparatus among others.

The present inventors have clarified the mechanism of this phenomenon.

This mechanism will be described in detail with reference to FIG. 14.

FIG. 14 is a schematic cross sectional view of a signal processing device applied to the solid state image pickup apparatus shown in FIG. 13.

In FIG. 14, reference numeral 1101 represents an n-type semiconductor substrate and reference numeral 1102 represents a p-type semiconductor region formed in the n-type semiconductor substrate 1101. Reference numeral 1108 represents a p-type MOS transistor formed in the n-type semiconductor substrate 1101 and reference numeral 1109 represents an n-type MOS transistor formed in the p-type semiconductor region 1102. The p-type MOS transistor 1108 and n-type MOS transistor 1109 schematically show a CMOS circuit in the horizontal scanning circuit 1104. Reference numeral 1103 represents a holding capacitor made of a pMOS inverted capacitor. Since an output signal from a pixel is in the range from 0 to 3 V, the pMOS inverted capacitor has been used as the holding capacitor 1103. The reason for this is as follows. Since the image pickup apparatus uses electrons among pairs of electrons and holes generated by photoelectric conversion, an nMOS source follower amplifier is used as the amplifier circuit in a pixel. In this case, if the power supply voltage is 5 V, the source follower in the dark state outputs a signal lower than an input signal by a threshold voltage. This signal takes 2 to 3 V, upon which an optical signal is superposed, and a lower voltage is output. A capacitor having a constant capacitance in such a voltage range cannot be formed by using an nMOS capacitor. From this reason, the pMOS inverted capacitor has been used.

Next, a method of driving the conventional signal processing device shown in FIG. 14 will be described.

FIG. 15 is a timing chart showing the response waveform of a signal read from the signal processing device shown in FIG. 14 and other voltage changes when a drive reference clock is input to the horizontal scanning circuit 1104.

Referring to FIG. 15, synchronously with a rise and fall of a reference clock, switches in the horizontal scanning circuit turn on and off at the same time so that a large current flows through a power supply line VDD or VSS. Therefore, each power supply line is subjected to a voltage change corresponding to the wiring resistance. Since a large current cannot be supplied only from the power supply line, charges are pulled out from the n-type semiconductor substrate 1101 which is a large charge pool. Therefore, the n-type semiconductor substrate (NSUB) 1101 itself is subjected to a voltage change as shown in FIG. 15. As the voltage at NSUB changes, the voltage at the common signal line capacitively coupled (Ch_l) to NSUB changes greatly, which results in an "output signal" waveform shown in FIG. 15. It takes a time until the waveform is stabilized. From this reason, the operation frequency cannot be made high.

Since NSUB is used as a reference terminal of the holding capacitor CT made of a pMOS inverted capacitor, as the voltage at NSUB changes, noises appear on the common signal line via the holding capacitor CT and transfer switch.

In this case, a large output difference appears depending upon the horizontal position, which is called shading. The reason for this is as follows.

A voltage change at NSUB is different at each horizontal position. Obviously the voltage at NSUB as the ground terminal of the holding capacitor is fixed to ground by a metal wiring pattern. However, the resistance of this wiring pattern cannot be neglected if the image pickup apparatus has a large panel, and the resistance value of the metal wiring pattern for fixing to the ground terminal changes with the horizontal position. As the voltage at NSUB changes with the horizontal position, the output signal value changes with the horizontal position. If the signal processing stands by until clock noises disappear, this shading can be suppressed. However, the operation frequency cannot be made high.

FIG. 16 is a circuit diagram of a conventional image pickup apparatus. As shown in FIG. 16, the region under the holding capacitors 1003 and horizontal common signal line 1005 corresponds to the semiconductor substrate 1001 shown in FIG. 15.

SUMMARY OF THE INVENTION

It is an object of the invention to provide a signal processing device capable of suppressing a voltage change of a power supply when output signals from a plurality of signal sources are read, and capable of outputting a stable signal at a high sensitivity, and to an image pickup apparatus using such a signal processing device.

According to one aspect of the present invention, there is provided a signal processing device comprising: a plurality of terminals connectable to a plurality of signal sources; and a read circuit for converting signals input from said terminals into serial signals and outputting the serial signals, wherein: said read circuit comprises a holding capacitor connected to each of said terminals, a transfer switch for transferring a signal held in said holding capacitor to a common signal line, and a shift register for driving said transfer switch; and a semiconductor layer under said common signal line has a conductivity type opposite to a first conductivity type of a semiconductor substrate.

According to another aspect of the present invention, there is provided a solid state image pickup apparatus comprising: pixels including a photoelectric conversion unit formed on a semiconductor substrate of a first conductivity type; holding capacitors for holding output signals from said pixels; a horizontal scanning circuit for sequentially reading the output signals held in said holding capacitors to a horizontal common signal line; and a common read circuit for reading the output signals on the horizontal common signal line, wherein a semiconductor layer under said horizontal common signal line has a conductivity type opposite to the first conductivity type of the semiconductor substrate.

According to still another aspect of the present invention, there is provided a solid state image pickup apparatus comprising: pixels including a photoelectric conversion unit formed on a semiconductor substrate of a first conductivity type; holding capacitors for holding output signals from said pixels; a horizontal scanning circuit for sequentially reading the output signals held in said holding capacitors to a horizontal common signal line; and a common read circuit for reading the output signals on the horizontal common signal line, wherein said holding capacitors are formed in a semiconductor layer having a conductivity type opposite to the first conductivity type of the semiconductor substrate.

DETAILED DESCRIPTION OF THE PREFERRED EMBODIMENTS

Embodiments of the invention will be described in detail with reference to the accompanying drawings.

First Embodiment

Figure 1:
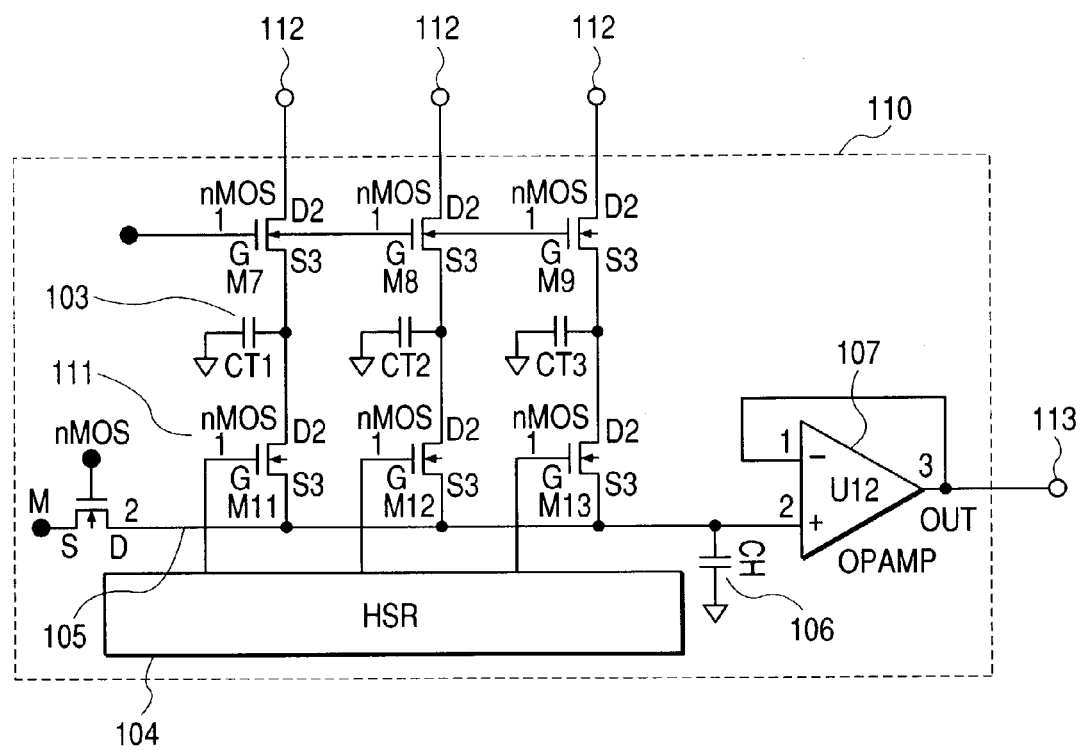
FIG. 1 is a circuit diagram of a signal processing device according to a first embodiment of the invention.

FIG. 1 is a circuit diagram of a signal processing device according to the first embodiment of the invention. In FIG. 1, reference numeral 112 represents a plurality of terminals connected to a plurality of signal wiring lines connected to signal sources. Reference numeral 110 represents a read circuit for converting parallel signals transferred via the terminals 112 into serial signals and outputting them, and reference numeral 113 represents a terminal for connection of an output signal output from a read common amplifier 107 to another suitable circuit for use.

The terminal 113 is connected to an A/D converter circuit (not shown).

Alternatively, the A/D converter circuit (not shown) may be provided in the read circuit 110 and connected via the terminal 113 to a processing circuit such as a memory or the like.

Reference numeral 103 represents a holding capacitor (CT) for holding an output signal supplied from a signal source (not shown) via a vertical output line (not shown), reference numeral 105 represents a horizontal common signal line, reference numeral 111 represents a transfer switch for transferring an output signal held in the holding capacitor (CT) 103 to the horizontal common signal line 105, reference numeral 104 represents a horizontal scanning circuit made of a shift register for driving the transfer switches 111, and reference numeral 106 represents a common signal line capacitor CH constituted of the holding capacitor 103 and parasitic capacitor and the like of the horizontal common signal line 105.

Figure 2:
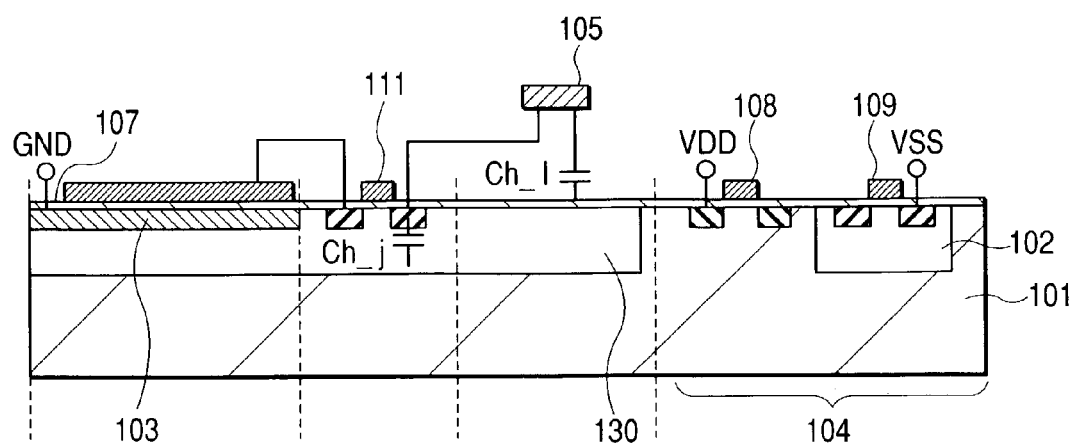
FIG. 2 is a schematic cross sectional view of the signal processing device of the first embodiment.

FIG. 2 is a schematic cross sectional view of the signal processing device of the first embodiment.

Figure 14:
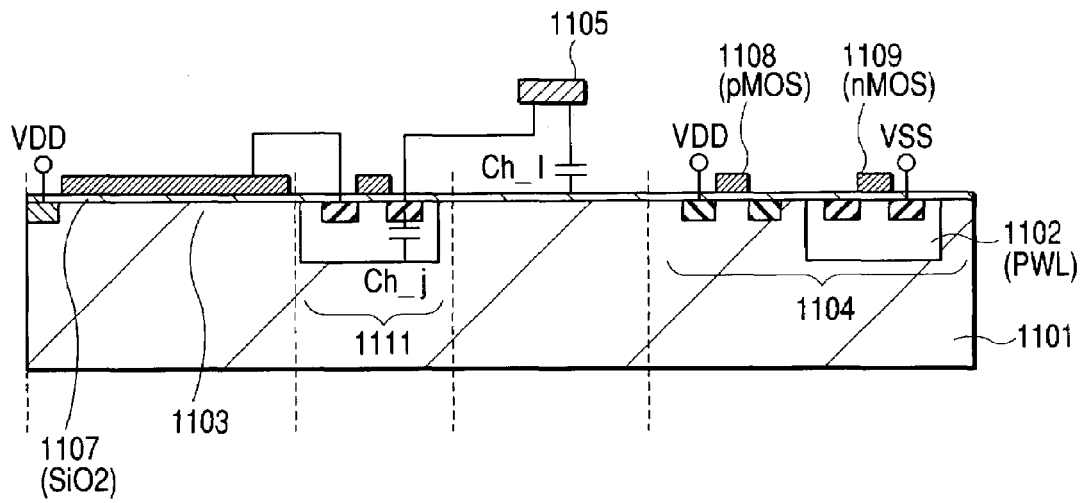
FIG. 14 is a schematic cross sectional view of the image pickup apparatus having the conventional signal processing device.
Figure 15:
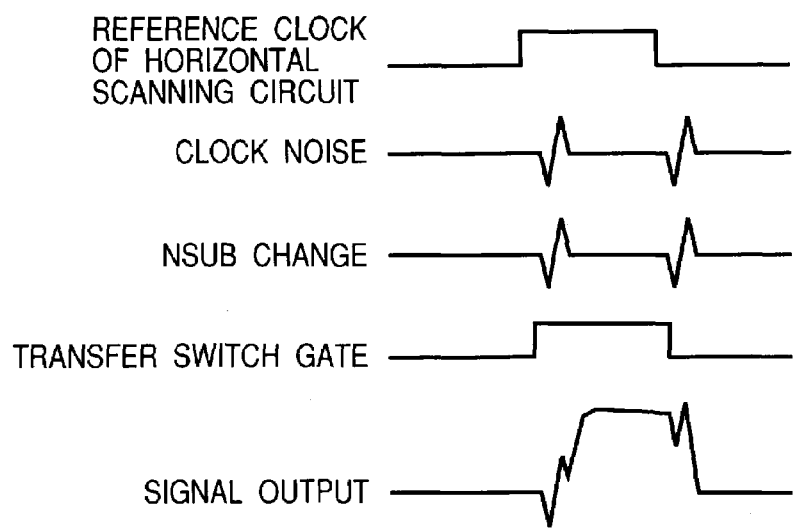
FIG. 15 is a timing charge showing a response waveform of a signal read from the conventional signal processing device.

A different point of the signal processing device shown in FIG. 2 from that shown in FIG. 14 resides in that a p-type impurity doped region 130 having a conductivity type opposite to that of a semiconductor substrate is disposed under the horizontal common signal line 105.

In FIG. 2, reference numeral 101 represents an n-type semiconductor substrate, reference numeral 102 represents a p-type semiconductor region disposed in the n-type semiconductor substrate, reference numeral 107 represents an insulating oxide film, reference numeral 108 represents a p-type MOS transistor disposed in the n-type semiconductor substrate 101, and reference numeral 109 represents an n-type MOS transistor disposed in the p-type semiconductor region 102. The horizontal scanning circuit 104 is made of a CMOS circuit constituted of the p-type MOS transistor 108 and n-type MOS transistor 109.

The signal processing device of the embodiment is characterized in that the p-type impurity doped region 130 is disposed under the horizontal common signal line 105 to shield the horizontal common signal line 105 from a voltage change at the n-type semiconductor substrate 101. The p-type impurity doped region 130 may be the region similar to the p-type semiconductor region in which the n-type MOS transistor 109 is disposed or the high impurity concentration region used as the source/drain regions of the p-type MOS transistor 108.

If the n-type semiconductor substrate 101 is changed to a p-type semiconductor substrate, i.e., if the conductivity type of a semiconductor wafer is a p-type, the n-type MOS transistor 109 is changed to an n-type MOS transistor and the p-type impurity doped region 130 is changed to an n-type impurity doped region. If a metal pattern is simply used as the shielding layer, the wiring capacitance components of the horizontal common signal line 105 become very large and the S/N ratio important as the sensor performance is lowered.

The invention provides an effective means for suppressing a voltage change of the n-type semiconductor substrate 101 without lowering the S/N ratio. If the holding capacitor 103 is made of the pMOS inverted capacitor, a voltage change of the n-type semiconductor substrate 101 is superposed upon a voltage on the horizontal common signal line 105 in proportion to the capacitance of the holding capacitor 103. However, if the holding capacitor 103 is constituted of an N type layer formed in the p-type impurity doped layer 130, a voltage change of the n-type semiconductor substrate 101 can be shielded. In order to retain a wide operation range, the surface of an n-type layer having a relatively high impurity concentration, e.g., about $10^{18}$ cm$^{-3}$, is oxidized to form an oxide film 107. An electrode is formed on the oxide film to form a capacitor. It is preferable to use this capacitor. The n-type layer sandwiched between the p-type impurity doped layer and oxide film 107 is connected to the ground potential (fixed potential). According to a general design concept, the capacitor constituted of the high impurity concentration n-type layer, oxide film 107 and electrode is not used as the holding capacitor because the oxide film becomes thick oxidation growth. The mechanism of the above-described problems has been analyzed and it has been found that the capacitor conventionally avoided is optimum. Similar effects can be obtained also by a capacitor made of polysilicon, an oxide film and polysilicon.

The signal processing devices of the first embodiment and the third embodiment to be described later are suitable for use with an image pickup apparatus to be described in the second embodiment.

Second Embodiment

Figure 3:
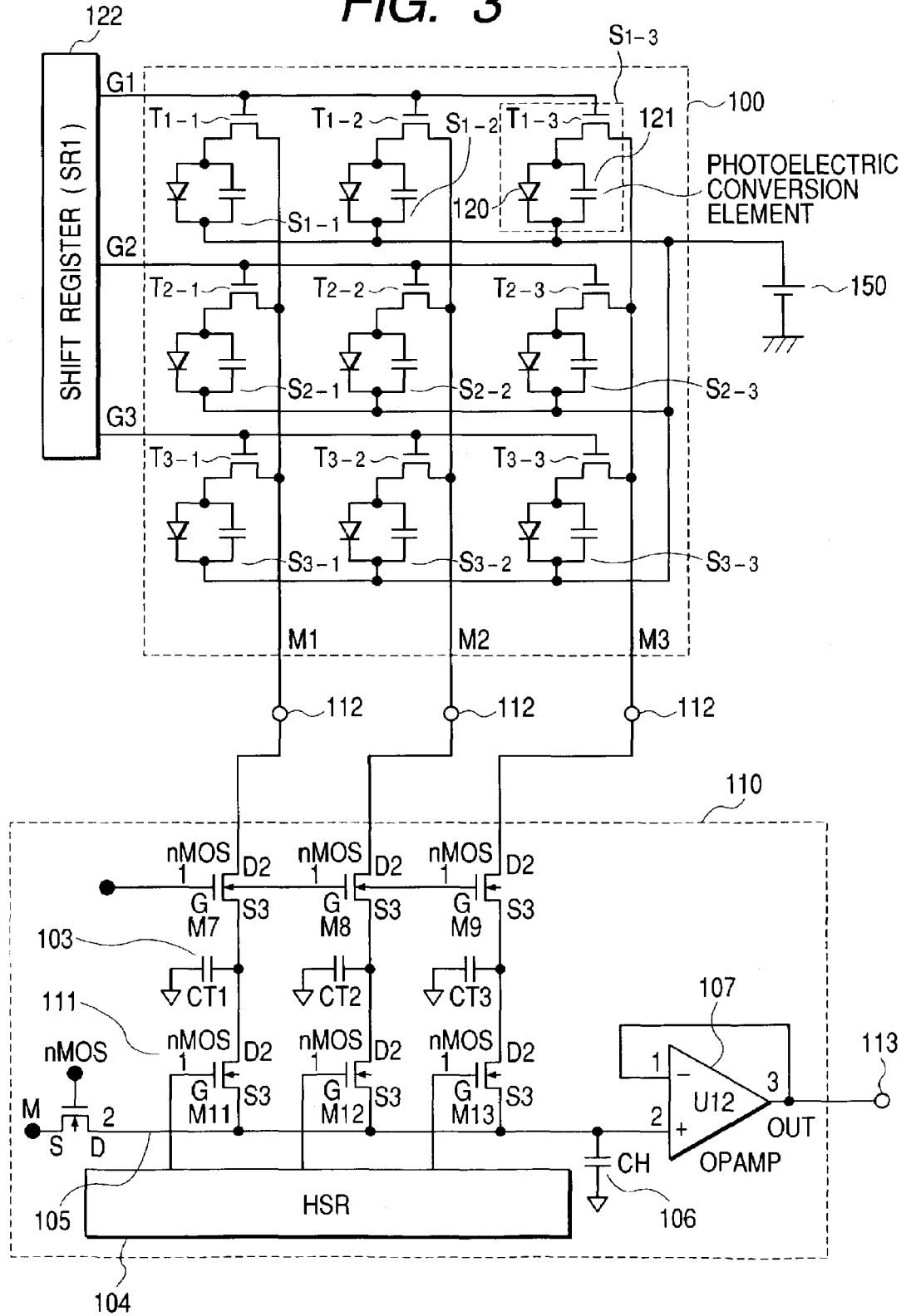
FIG. 3 is a circuit diagram of an image pickup apparatus having the signal processing device of the first embodiment, according to a second embodiment of the invention.

FIG. 3 is a circuit diagram of an image pickup device according to the second embodiment of the invention. In FIG. 3, reference numeral 100 represents a photoelectric conversion circuit, reference numeral 120 represents a light reception area for converting incident light into signal charges, reference numeral 121 represents an inter-electrode capacitor for accumulating the signal charges photoelectrically converted by the light reception area 120, and St-t (t=1 to 3) represents a pixel having the light reception area 120, the inter-electrode capacitor 121 and a switching element Tt-t. For example, a pixel S1-3 has a light reception area 120, an inter-electrode capacitor 121 and a switching element T1-3.

Figure 4:
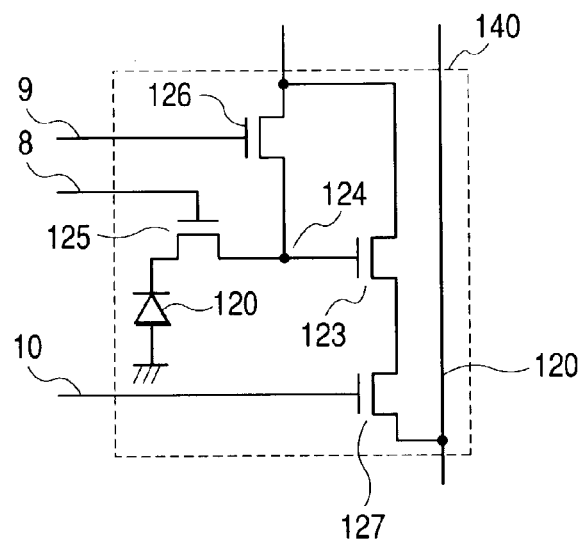
FIG. 4 is a circuit diagram showing another example of a pixel structure applied to the image pickup apparatus of the invention.

Each of the pixels S1-1 to S3-3 may have an amplifier transistor and/or a reset transistor, depending upon its use. FIG. 4 is a circuit diagram showing another structure of a pixel applicable to the image pickup apparatus. In FIG. 4, reference numeral 140 represents a unit pixel area, reference numeral 125 represents a transfer MOS transistor which transfers signal charges photoelectrically converted by a photodiode 120, reference numeral 124 represents a floating diffusion region for storing signal charges transferred by the transfer MOS transistor, reference numeral 126 represents a reset MOS transistor for resetting the floating diffusion region, reference numeral 123 represents an amplification MOS transistor constituting a source follower circuit, and reference numeral 127 represents a select MOS transistor for selecting a pixel.

Reverting to FIG. 3, M1, M2 and M3 represent vertical output lines used as signal wiring lines, T1-1 to T3-3 represent the switching elements for transferring signal charges formed in the pixels S1-1 to S3-3 to the vertical output lines M1, M2 and M3, and G1, G2 and G3 represent gate drive wiring lines for driving the switching elements T1-1 to T3-3. In each pixel, the photoelectric conversion element for converting light into signal charges may be a MIS type or PIN type thin film photoelectric conversion element using an amorphous silicon hydride film, a PN photodiode using single crystal silicon or the like. The switching element may be a thin film transistor using amorphous silicon, polysilicon, single crystal silicon or the like, a known MOS transistor or the like.

Reference numeral 122 represents a drive circuit (vertical shift register SR1) for applying drive signals to the gate drive wiring lines G1 to G3. Reference numeral 150 represents a bias power source for the photoelectric conversion elements.

If the photoelectric conversion element or switching element is made of a thin film element, the drive circuit is preferably formed by using at least one LSI chip made of single crystal silicon, and the read circuit is also preferably formed by using at least one LSI chip made of single crystal silicon.

In FIG. 3, although the two-dimensional photoelectric conversion apparatus having 3×3=9 pixels is shown for the purposes of simplicity, the actual solid state image pickup apparatus is made of a number of pixels depending upon its use.

The read circuit 110 shown in FIG. 3 is the same as the read circuit 110 shown in FIG. 1. Elements represented by identical reference symbols and numerals have already been described and the description thereof is omitted.

In the above-described embodiments and each embodiment to be described in the following, a signal source may be a conversion element for receiving light and/or radial rays and generating charges, a sensor for sensing heat and generating a signal, a sensor for sensing sound and generating a signal or the like.

If the conversion element for receiving light and/or radial rays and generating charges is used as a signal source as in the case of a solid state image pickup apparatus, a CMOS type, CCD type, bipolar or thin film type image sensor may be used as a conversion element array circuit.

Third Embodiment

Figure 5:
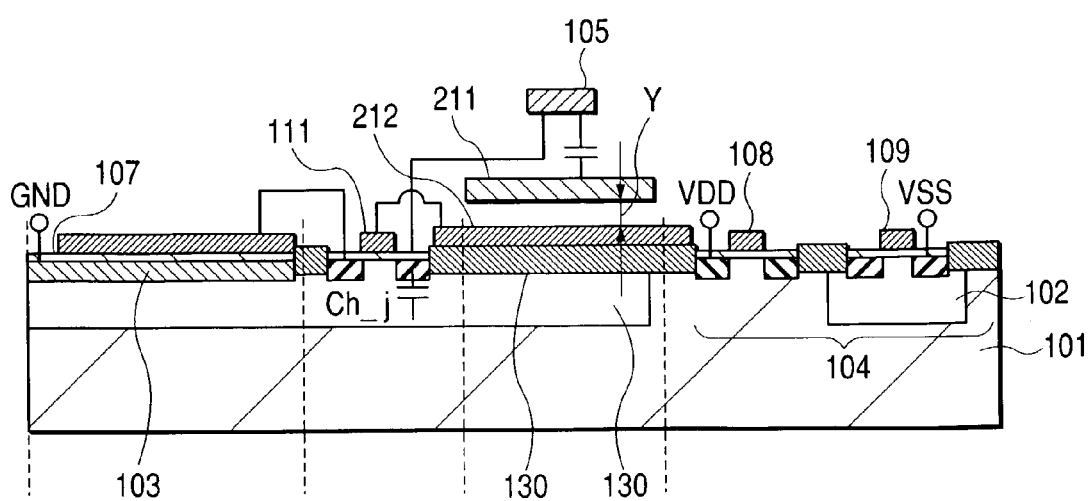
FIG. 5 is a schematic cross sectional view of a signal processing device according to a third embodiment of the invention.

FIG. 5 is a schematic cross sectional view of a signal processing device according to the third embodiment of the invention.

The circuit diagram of this embodiment is similar to that shown in FIG. 1.

Elements represented by identical reference symbols and numerals have already been described and the description thereof is omitted.

Similar to the circuit shown in FIG. 1, the transfer switch 111 is required in order to read an output signal held in the holding capacitor 103 to the horizontal common signal line 105. This transfer switch 111 is turned on and off by the horizontal scanning circuit 104 disposed opposite to the holding capacitor 103 with the horizontal common signal line 105 being interposed therebetween. In this case, the control signal supplied from the horizontal scanning circuit 104 is transferred via a signal line disposed under the horizontal common signal line 105.

More specifically, in FIG. 5, reference numeral 212 represents a logic signal line disposed on a field oxide film 213. The present inventors have found that a voltage change at the horizontal scanning circuit 104 is applied to the horizontal common signal line 105 via the signal line 212, namely, that the signal line is also required to be electrically shielded.

Reference numeral 211 represents a selective shield layer disposed between the signal line 212 and horizontal common signal line 105.

Good shielding can be performed without degrading the sensor performance considerably by incorporating the following layouts (1) to (4).

A simple metal pattern shield of prior art degrades the S/N ratio greatly, the S/N ratio being an important factor of the sensor performance.

(1) The p-type impurity doped layer 130 having a conductivity type opposite to the n-type semiconductor substrate 101 is disposed under the horizontal common signal line 105.

(2) The gate control line of the transfer switch 111 is made of polysilicon.

(3) The selective shield layer 211 made of a first-layer metal pattern is disposed relative to each gate control line described in (2). In this case, the shield region is disposed relative to the gate control line at an oversize of X μm. X μm is set to Y×0.3 or larger where Y is a distance between the gate control line and the first-layer metal pattern.

(4) The selective shield layer 211 is disposed above each gate control line except for opening or exposing a part of gate control lines (see FIG. 7), to thereby make the n-type semiconductor substrate 101 and p-type impurity doped region 130 be capacitively coupled to the horizontal common signal line 105.

Figure 6:
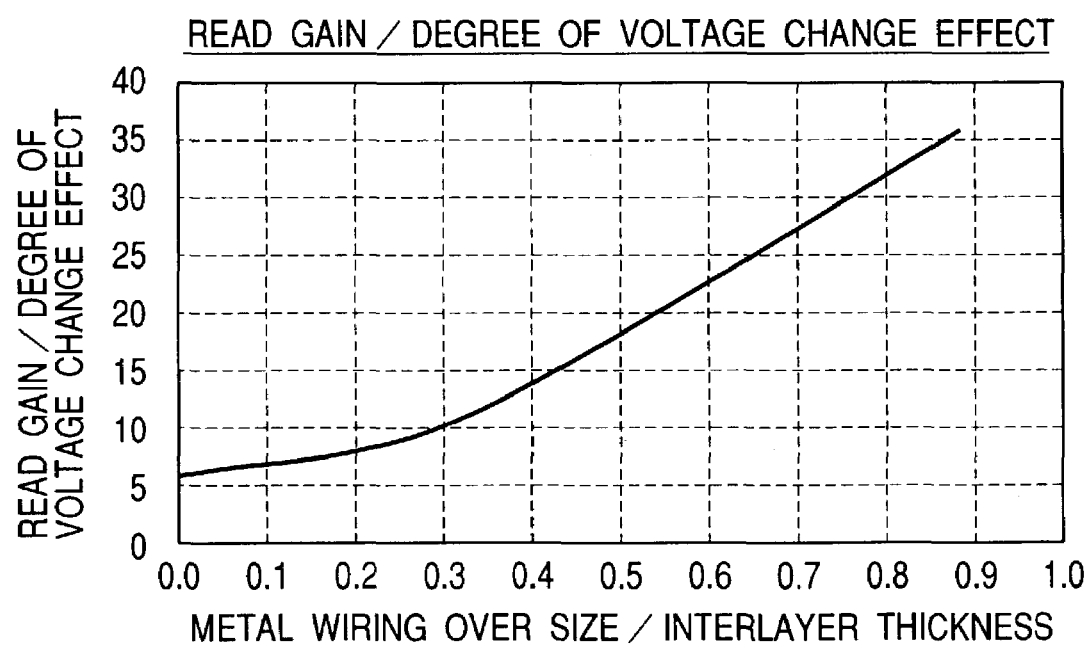
FIG. 6 is a graph showing the relation between an oversize of a selective shield layer and a degree of voltage change effect of an n-type semiconductor substrate.

FIG. 6 is a graph showing the relation between an oversize of the selective shield layer 211 and a degree of voltage change effect of the n-type semiconductor substrate 101.

The Y-axis of the graph represents a ratio of a read gain to a voltage change. This ratio is incorporated in order to take the read gain, typically the capacitance division ratio described earlier, into consideration. The larger the ratio, the better the sensor performance.

As seen from the graph of FIG. 6, the sensor performance is improved considerably if the ratio of the oversize to the interlayer thickness is 0.3 or larger. A good sensor performance can be obtained if the oversize X is set to Y×0.3 or larger.

The feature of this invention resides in that the selective shield layer 211 is disposed above each gate control line over not whole surface of an array of gate control lines. At least a part of the gate control lines is opened and exposed. Thereby the n-type semiconductor substrate 101 and p-type impurity doped region 130 are capacitively coupled to the horizontal common signal line 105, as specifically shown in FIG. 7.

Figure 7:
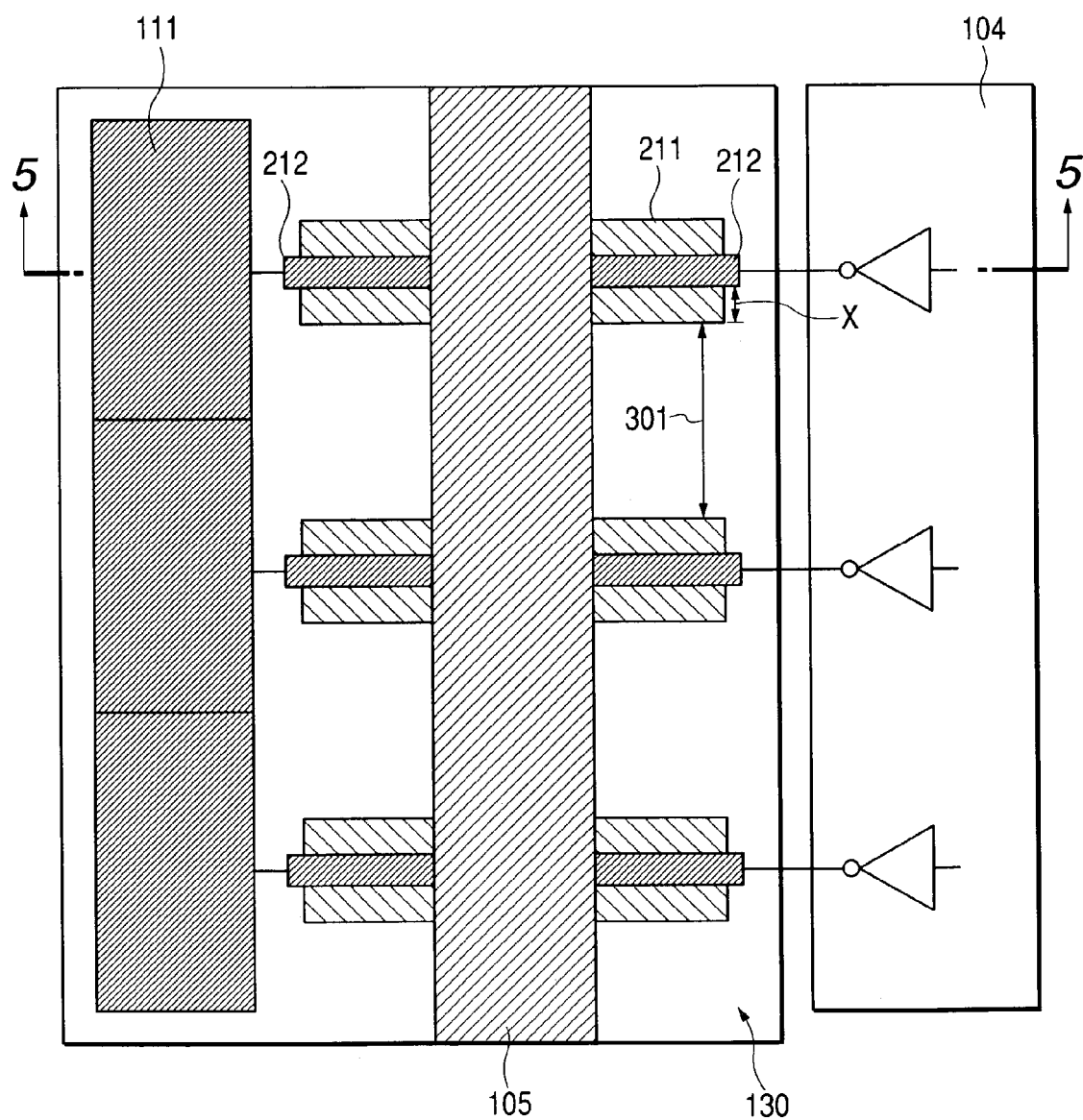
FIG. 7 is a plan view of the signal processing device of the third embodiment.

FIG. 7 is a plan view of the signal processing device of the third embodiment. The schematic cross sectional view shown in FIG. 5 is taken along line 5—5 shown in FIG. 7. In FIG. 7, the field oxide film 213 is not shown.

Referring to FIG. 7, reference numeral 301 represents a space area between the selective shield layers 211. Since only insulating material such as $SiO_2$ exists between the p-type impurity doped layer 130 and horizontal common signal line 105, the p-type impurity doped layer 130 is capacitively coupled to the horizontal common signal line 105.

With the above-described layouts, although the influence of a voltage change at the gate control electrodes can be mitigated, if the size of the selective shield layer 211 is made large to some degree, the capacitance of the horizontal common signal line 105 becomes large. From this reason, it is preferable that the selective shield layer 211 is disposed above each gate control line over not whole surface of an array of gate control lines. At least a part of the control line is exposed or opened. Conventionally, a voltage change at NSUB influences the region not shielded with the selective shield 211 made of the first-layer metal pattern. In this embodiment, as described in (1), the p-type impurity doped region 130 is disposed under the horizontal common signal line 105 so that the influence of a voltage change at the n-type semiconductor substrate 101 can be suppressed. Namely, it is preferable that the p-type impurity doped region 130 and selective shield layer 211 are disposed in proper combination. An image pickup device having a good sensor performance including a good S/N ratio can therefore be provided.

In order to form the above-described structure, it is effective to use a chemical mechanical polishing (CMP) process for the wiring forming process.

A distance between the horizontal common signal line 105 and p-type impurity doped layer 130 is Y+Z1+Z2 if the CMP process is used, where Y is a distance between the selective shield layer and the silicon surface, Z1 is a thickness of the selective shield layer and Z2 is a distance between the selective shield layer and horizontal common signal line. If the CMP process is not used, the distance between the horizontal common signal line 105 and p-type impurity doped layer 130 is Y+Z2. The capacitance between the horizontal common signal line 105 and p-type impurity doped region 130 becomes smaller if the CMP process is used so that a high capacitance division ratio and a better sensor performance can be obtained.

The third embodiment will be further detailed with reference to FIG. 8.

Figure 8:
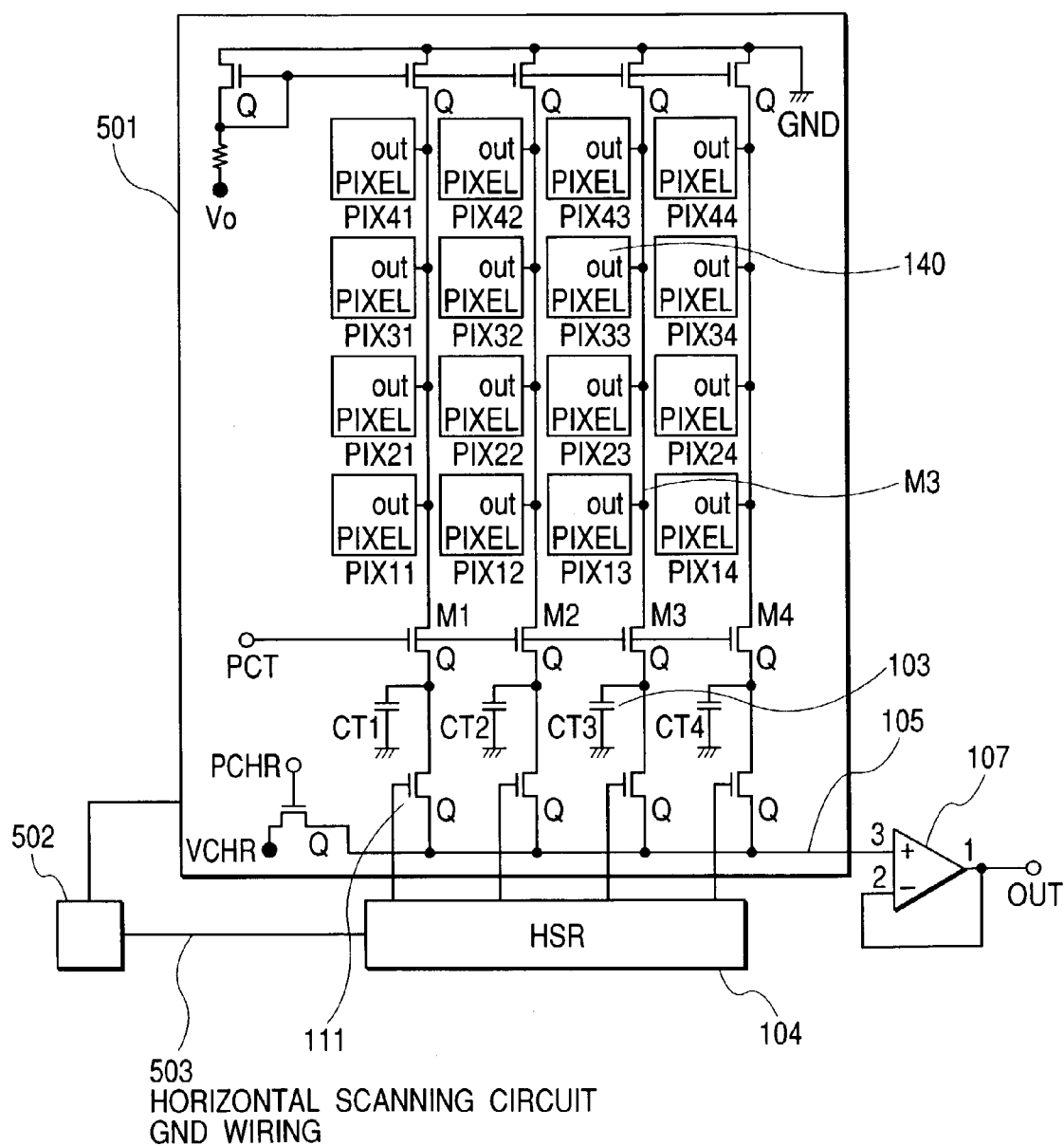
FIG. 8 is a circuit diagram of an image pickup apparatus having the signal processing device of the third embodiment.

FIG. 8 is a circuit diagram of an image pickup apparatus having the signal processing device of the third embodiment.

Specifically, an output from a pixel 140 is once held in a holding capacitor 103 via a vertical output line M3, and a horizontal scanning circuit 104 sequentially reads output signals held in the holding capacitors 103, and outputs them to a horizontal common signal line 105 and to a common read amplifier 107. In this embodiment, the common read amplifier 107 is a voltage follower. An output voltage read from the holding capacitor 103 to the horizontal common signal line 105 is given by the equation (1) described earlier, which equation indicates the voltage read method by capacitance division. In FIG. 8, reference numeral 501 represents a region where the p-type impurity doped layer 130 is formed.

In this embodiment, the p-type impurity doped layer 130 extends under the holding capacitor 103 and horizontal common signal line 105. The holding capacitor 103 is constituted of the p-type impurity doped layer 130. Prior to forming the gate electrode, n-type impurities are implanted and the substrate surface is oxidized. Thereafter, a gate electrode is formed above the n-type impurity doped region. With this structure, although the capacitance is reduced slightly, the good capacitor without a voltage dependency of the capacitance value can be obtained.

Figure 16:
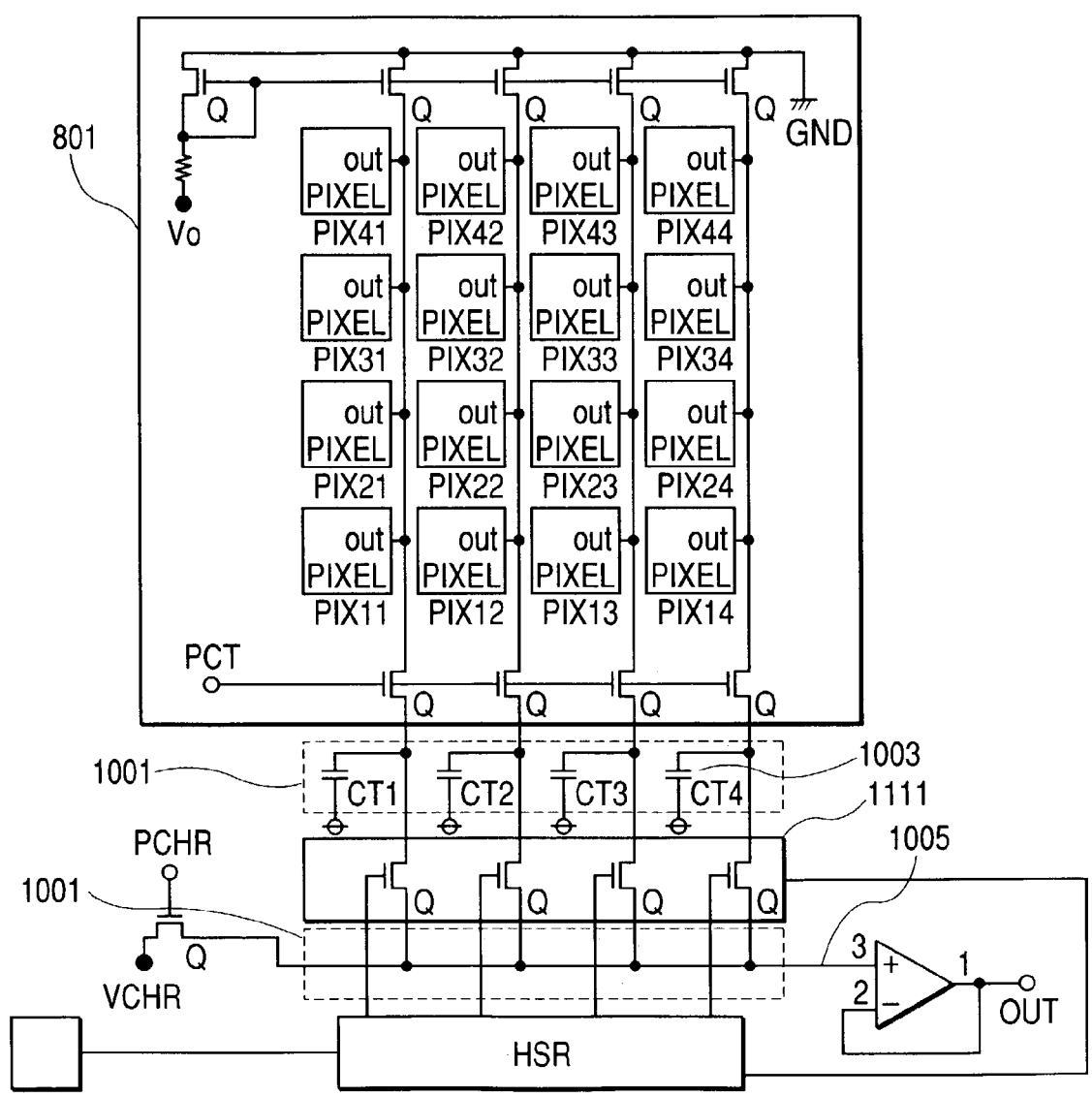
FIG. 16 is a circuit diagram of an image pickup apparatus having a conventional signal processing device.

In the prior art shown in FIG. 16, the n-type semiconductor region is disposed under the holding capacitor 1003 and horizontal common signal line 1005.

In this embodiment, a wiring line used for fixing the voltage at the p-type region 501 containing pixels 140 is branched from a chip 502 in order to suppress the influence of a voltage change at the ground power supply of the horizontal scanning circuit 104.

In this embodiment, the selective shield layer is not provided for the gate control line of the transfer switch 111.

According to the embodiment, improvement on the sensor characteristics was confirmed as in Table 1.

TABLE 1

|  | Prior Art (FIG. 16) | Embodiment (FIG. 8) |
|---|---|---|
| Horizontal Shading in Dark State | 20 mV | 2 mV |
| Output Change by Voltage Change at Power Supply | 100 mV | 10 mV |
| Read Operation Frequency | 12 MHz | 25 MHz |

Since an output change by a voltage change at the power supply became small, i.e., since noises on an output waveform disappeared, the time until an output becomes stable was able to be shortened and the read operation frequency was improved to 25 MHz.

The selective shield layer is provided for the gate control line of each transfer switch 111.

The oversize X shown in FIG. 6 of the selective shield layer relative to the gate control line was set to 0.8 μm. An interlayer film between the gate control line and selective shield layer was 900 nm. The whole surface of the array of gate control lines was not covered, but a partial surface was covered. The opening or space ratio was 65%.

Improvement on the sensor characteristics was confirmed as in Table 2.

TABLE 2

|  | Prior Art (FIG. 16) | Embodiment (FIG. 8) | Whole Area Shield (FIG. 8) |
|---|---|---|---|
| Horizontal Shading in Dark State | 20 mV | 1 mV | 1 mV |
| Output Change by Voltage Change at Power Supply | 100 mV | 5 mV | 1 mV |
| Read Operation Frequency | 12 MHz | 32 MHz | 32 MHz |
| Capacitance Division Ratio | 0.35 | 0.32 | 0.22 |

Although the capacitance division ratio was lowered by about 8%, the output change was reduced by 1/10. The sensor characteristics were therefore improved. The read operation frequency was improved not to the degree controlled by an output change but to the degree controlled by the performance of an amplifier Table 2 also shows the characteristics when the selective shield covers the whole area.

Although the output change by a voltage change at the power supply was further improved, the capacitance division ratio was degraded to 0.22.

Since the influence of the output change was sufficiently small for the read operation frequency and the read operation frequency was improved to the degree controlled by other factors, there is only a small merit of suppressing the output change. By covering not whole surface of the array of gate control lines, and exposing at least a part of the gate lines, the influence of the output change by the voltage change at the power supply was suppressed and a high read gain was able to be obtained. Good sensor characteristics were obtained.

Fourth Embodiment

Figure 9:
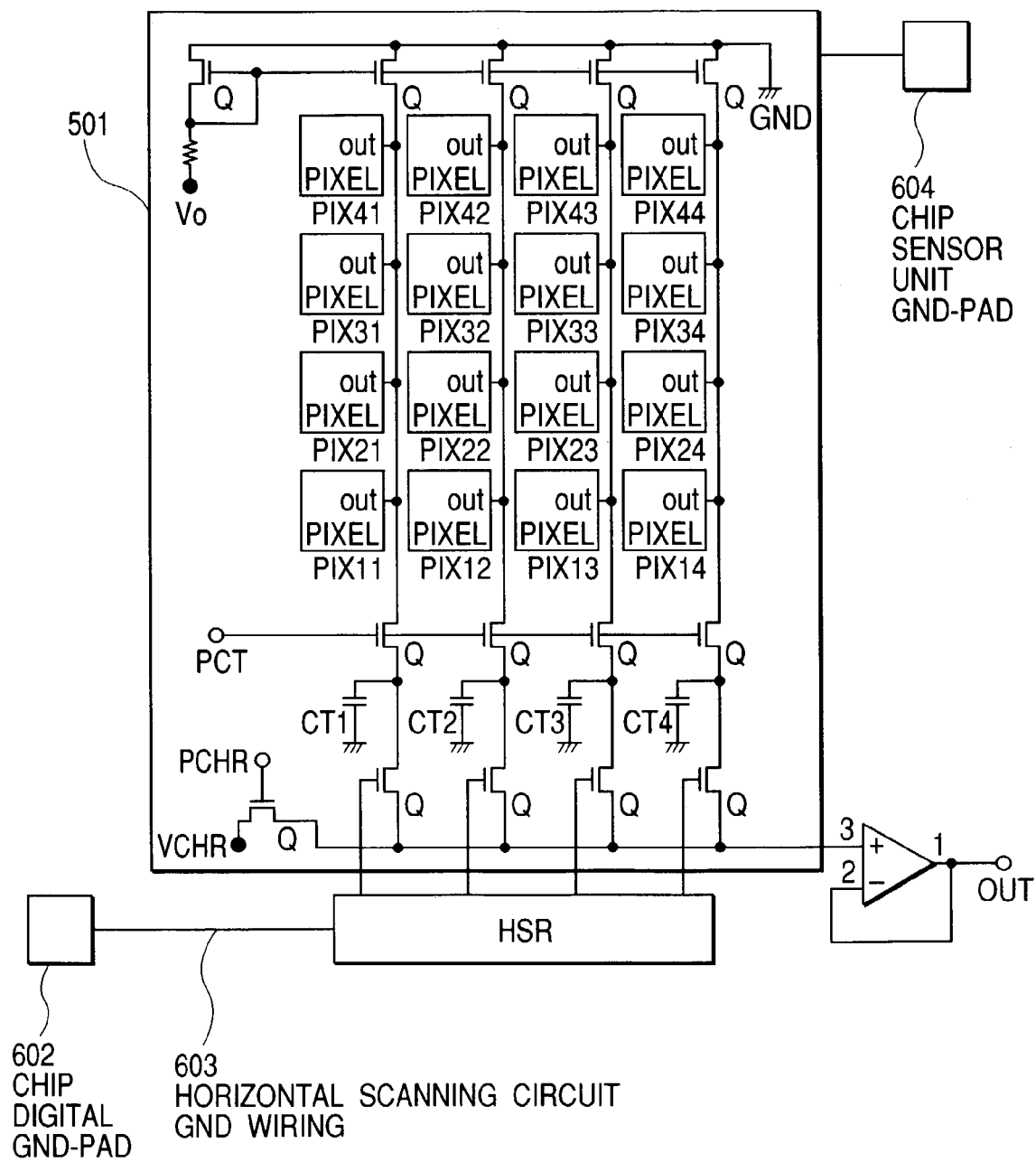
FIG. 9 is a circuit diagram of an image pickup device according to a fourth embodiment of the invention.

FIG. 9 is a circuit diagram of an image pickup apparatus according to the third embodiment of the invention.

A feature of this embodiment resides in that as different from the pad 502 shown in FIG. 8, the pad 502 is separated into pads 602 and 604 to which a power source wiring line for digital circuits which cause an output change and a power source wiring line for the sensor unit and shield (p-type impurity doped layer and selective shield) are connected.

The pad 502 shown in FIG. 8 cannot provide a perfect separation so that shading exists to some degree. In this embodiment, by using separate pads, the sensor characteristics were further improved. By applying this structure to a solid state image pickup apparatus having a number of pixels, the high sensor performance was able to be maintained.

TABLE 3

|  | Prior Art (FIG. 16) | Embodiment (FIG. 9) |
|---|---|---|
| Horizontal Shading in Dark State | 20 mV | 0.3 mV |
| Output Change by Voltage Change at Power Supply | 100 mV | <0.2 mV |
| Read Operation Frequency | 12 MHz | 32 MHz |

Fifth Embodiment

Figure 10:
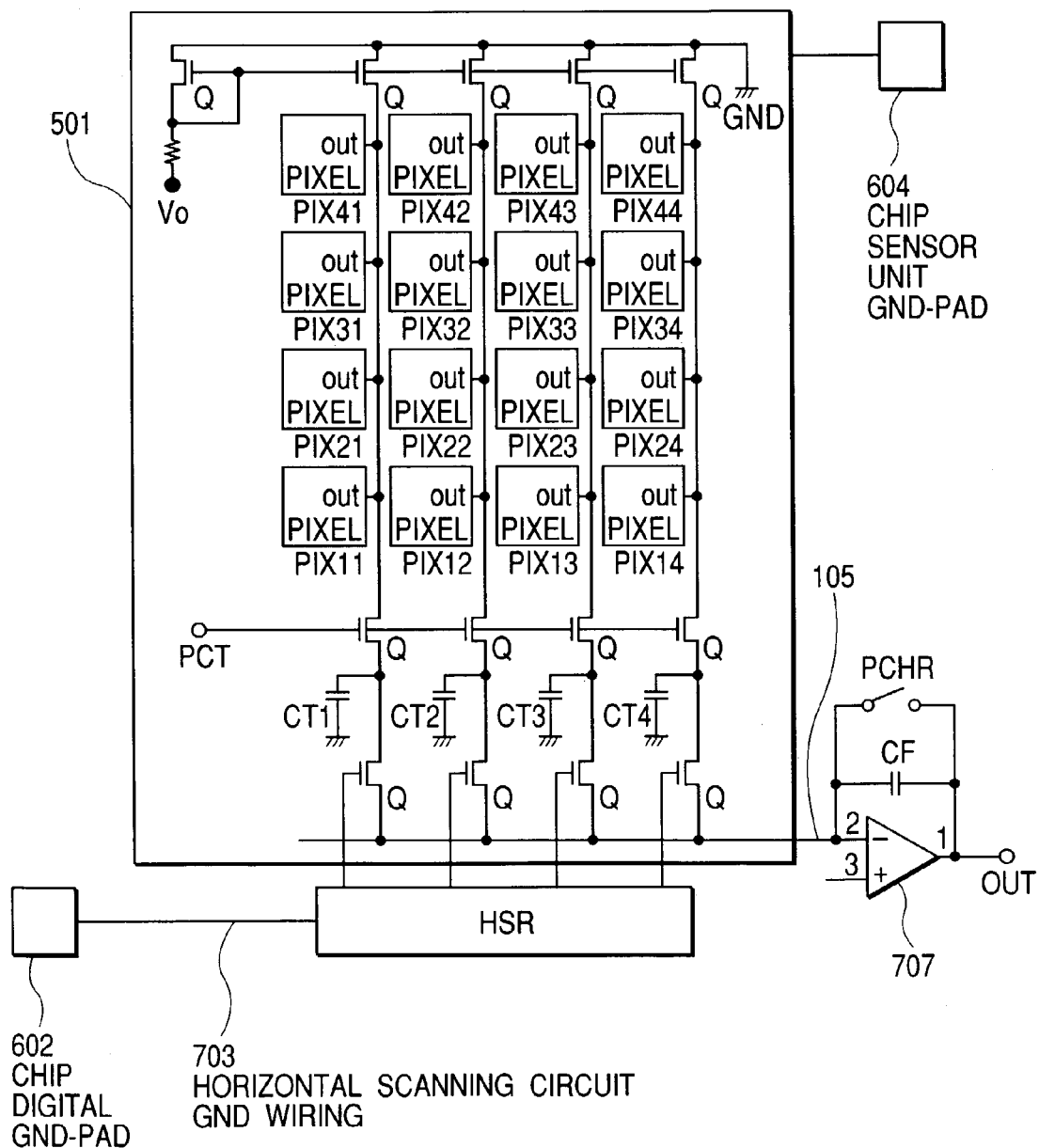
FIG. 10 is a circuit diagram of an image pickup device according to a fifth embodiment of the invention.

FIG. 10 is a circuit diagram of an image pickup apparatus according to the fifth embodiment of the invention.

A feature of this embodiment resides in that a charge read type amplifier 707 is used.

In this case, the read gain is not influenced by the capacitance Ch of the horizontal common signal line 105.

Namely, the read gain is defined by CT/Cf where Cf is a feedback capacitor of the charge read type amplifier 707. However, since the amplifier thermal noises are defined by (Cf+CT+Ch)/Cf, the S/N ratio is similar to the voltage read type.

The invention is effective also for such an amplifier. The characteristics similar to the fourth embodiment were obtained.

Sixth Embodiment

Figure 11:
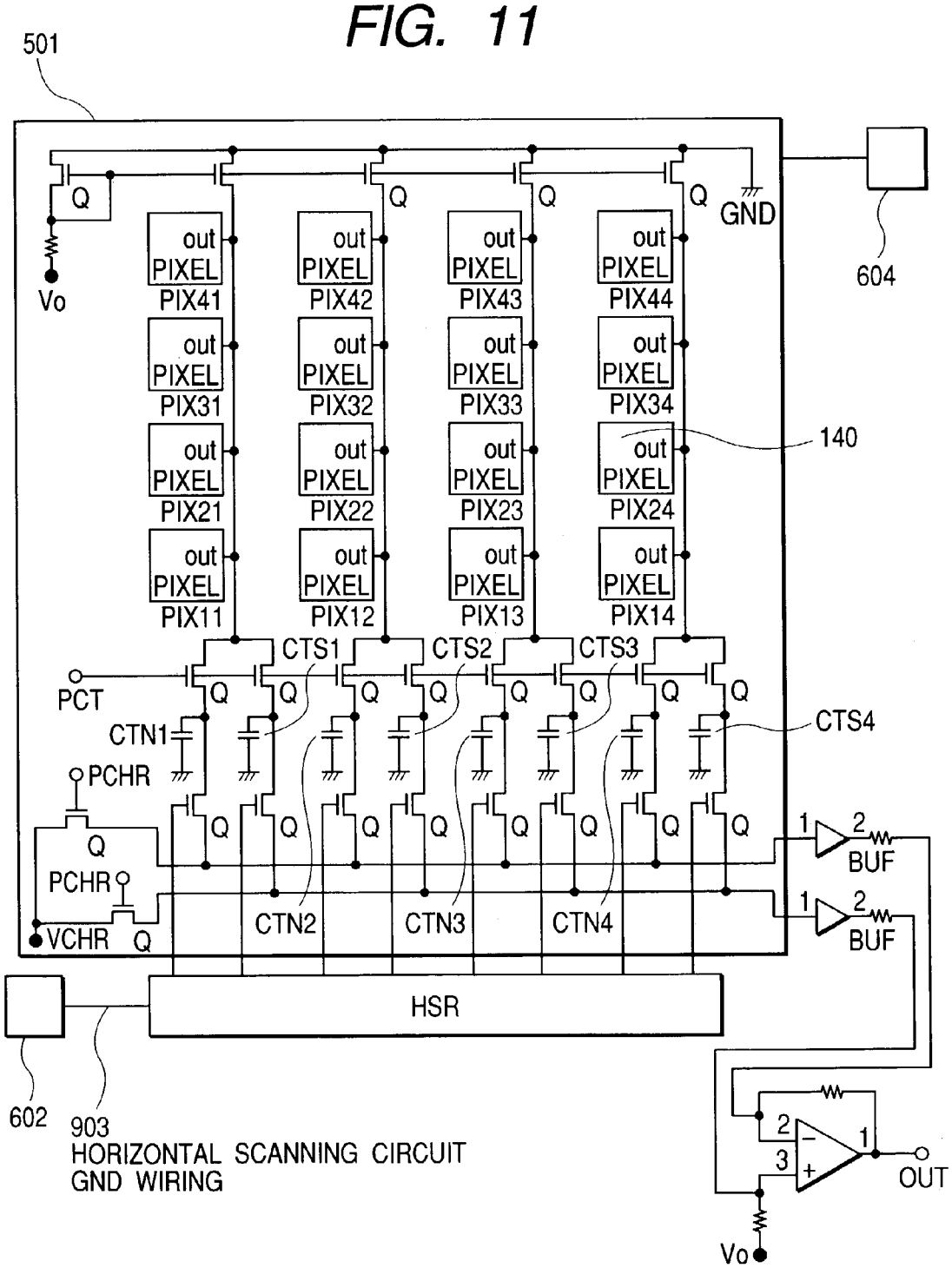
FIG. 11 is a circuit diagram of an image pickup device according to a sixth embodiment of the invention.

FIG. 11 is a circuit diagram of an image pickup apparatus according to the sixth embodiment of the invention.

In other embodiments, each unit vertical output line has one holding capacitor 103. In this embodiment, each unit vertical output line has a holding capacitor CTN and a holding capacitor CTS. More specifically, this embodiment uses a read method incorporating a noise elimination method wherein a noise N signal from a pixel 140 is held in the holding capacitor CTN and a signal (S) signal from the pixel 140 is held in the holding capacitor CTS. In this case, even if the n-type semiconductor region exists under the horizontal common signal line 105, a voltage change at the N wiring line as the horizontal common signal line 105 is ideally the same as a voltage change at the S wiring line as the horizontal common signal line 105, and the voltage changes are subtracted by the next stage subtraction amplifier so that there is no output change by the voltage change. However, in practice, the noise elimination ability is limited in terms of symmetry of S and N wiring lines of the horizontal common signal line 105 and symmetry of resistors of the subtraction amplifier. Although the noise elimination ability of about 40 dB is possible, it may lower to about 30 dB in some cases. In this embodiment, the noise elimination ability measured was 40 dB. The invention was applied to this signal charge read system and the following results shown in Table 4 were obtained.

TABLE 4

|  | Prior Art (FIG. 16) | Prior Art (voltage read) (FIG. 8) | Embodiment (FIG. 11) |
| --- | --- | --- | --- |
| Horizontal Shading in Dark State | 20 mV | 1 mV | 0.3 mV |
| Output Change by Voltage Change at Power Supply | 100 mV | 1 mV | <0.2 mV |
| Read Operation Frequency | 12 MHz | 25 MHz | 32 MHz |

The characteristics were further improved and good sensor characteristics were obtained.

Seventh Embodiment

Figure 12:
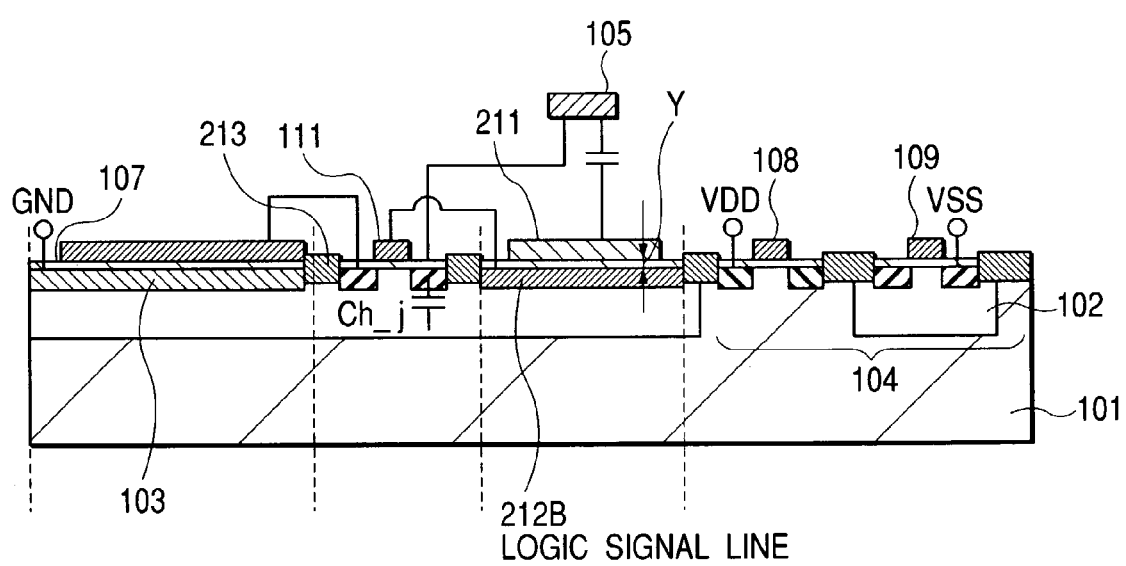
FIG. 12 is a schematic cross sectional view of a signal processing device according to a seventh embodiment of the invention.
Figure 13:
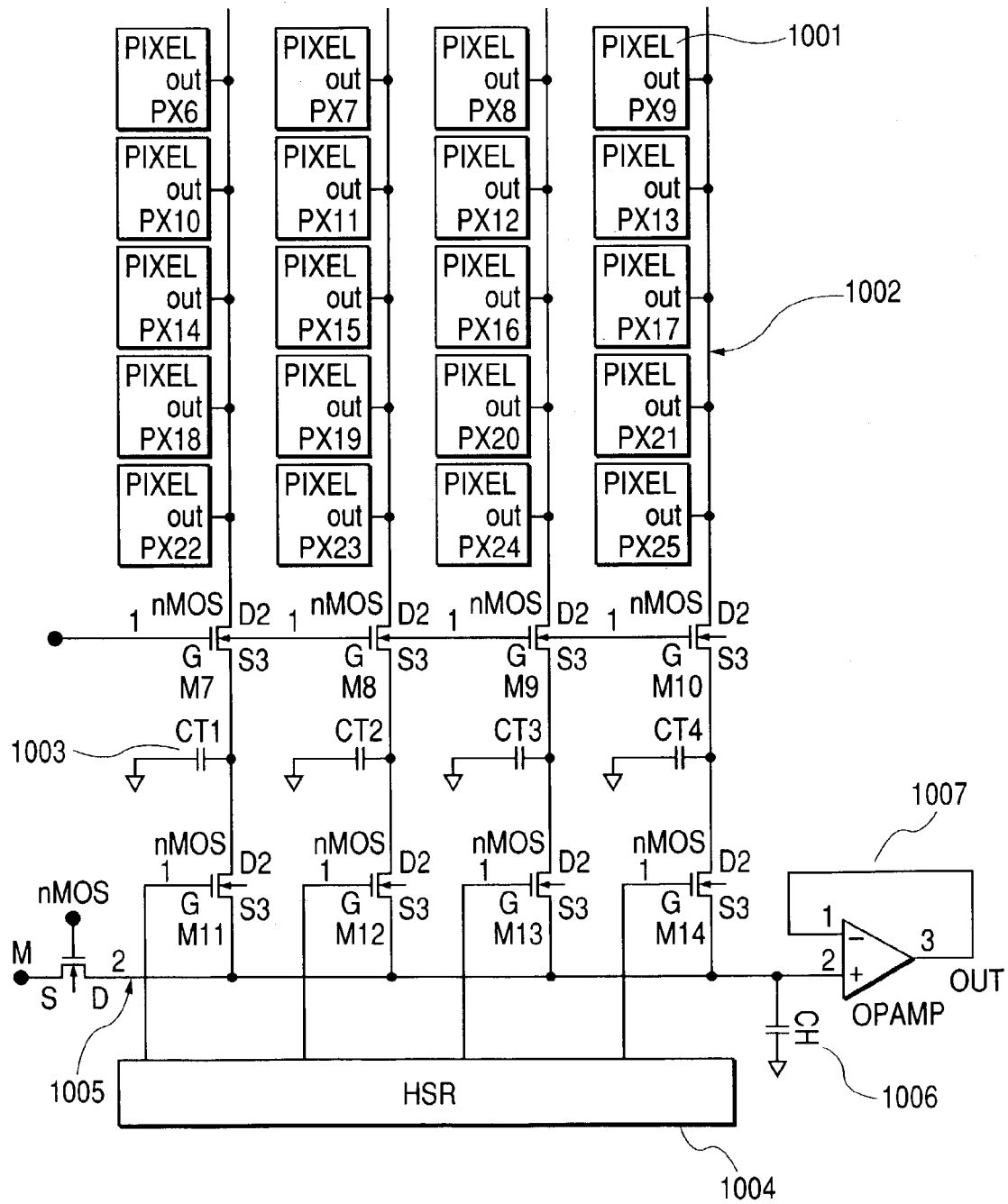
FIG. 13 is a circuit diagram of an image pickup apparatus having a conventional signal processing device.

FIG. 12 is a schematic diagram of a signal processing device according to the seventh embodiment of the invention.

Different points from the embodiment shown in FIG. 5 will be described. As a logic signal line 212 used as the gate control line of the transfer switch 111, an n-type impurity doped layer formed by the same process used for the holding capacitor 103 is used. As the selective shield layer 211, a wiring layer is used which is made of polysilicon and formed by the same process for forming the gate electrode of the transfer switch 111 and the like. A high capacitance division ratio of 0.34 was realized while the influence of a voltage change was suppressed.

As described so far, the image pickup apparatus of the invention has: pixels 140 including photoelectric conversion elements formed on a semiconductor substrate of a first conductivity type; holding capacitors 103 for holding output signals from the pixels; a horizontal scanning circuit 104 for sequentially reading output signals held in the holding capacitors to a horizontal common signal line 105; and a common read circuit 107 for reading an output signal on the horizontal common signal line 105.

As a first condition, a semiconductor layer under the horizontal common signal line 105 has a conductivity type opposite to the first conductivity type of the semiconductor substrate 101. As a second condition, the holding capacitor 103 is formed in the semiconductor layer having a conductivity type opposite to the first conductivity type of the semiconductor substrate 101. By satisfying one of or both of the first and second conditions, it becomes possible to suppress the influence of a voltage change at a power supply generated in the semiconductor substrate, without sacrificing a high read gain, and to read a number of pixels at high speed.

The semiconductor layer under the horizontal common signal line 105 has a conductivity type opposite to the first conductivity type of the semiconductor substrate 101, and a first conductive layer 211 is disposed between a control electrode wiring layer 212 for a first switch 111 and the horizontal common signal line 104, the first switch 111 being disposed between the holding capacitor 103 and horizontal common signal line 105.

The first conductive layer 211 is disposed covering the control electrode wiring layer 212 for the first switch 111 at least under the horizontal common signal line 105, and the first conductive layers 211 do not cover the whole surface of the array of control electrode wiring layer but are disposed spaced apart to make the horizontal common signal 105 line be capacitively coupled to the semiconductor layer under the horizontal common signal line.

The control electrode wiring layer 212 of the first switch 111 corresponds to an impurity doped later of the first conductivity type formed in the semiconductor layer having a conductivity type opposite to the first conductivity type.

The above-described embodiments are only illustrative and are not construed that the embodiments limit the technical scope of the invention. The invention can be practiced in various ways without departing from the technical concept and main features of the invention.

As described so far, according to the invention, it becomes possible to suppress the influence of a voltage change at a power supply generated in the semiconductor substrate, without sacrificing a high read gain, and to read a number of pixels at high speed.

What is claimed is:

1. A signal processing device comprising:
    a plurality of terminals connectable to a plurality of signal sources; and
    a read circuit for converting signals input from the plurality of terminals into serial signals and outputting the serial signals, the read circuit including:
    a holding capacitor connected to each of the plurality of terminals,
    a transfer switch for transfeffing a signal held in the holding capacitor to a common signal line, and
    a shift register for driving the transfer switch,
    wherein a transistor constituting the shift register is disposed in a semiconductor substrate of a first conductivity type, and
    wherein the holding capacitor and the transfer switch are formed in a semiconductor layer that is disposed under the common signal line and that has a conductivity type opposite to the first conductivity type of the semiconductor substrate.

2. A signal processing device according to claim 1, wherein a first conductive layer is disposed between a control electrode wiring line of the transfer switch and the common signal line.

3. A signal processing device according to claim 2, wherein the semiconductor layer under the common signal line is capacitively coupled with the common signal line.

4. A signal processing device according to claim 2, wherein the control electrode wiring line of the transfer switch is an impurity doped layer of the first conductivity type formed in the semiconductor layer under the common signal line.

5. A signal processing device according to claim 1, wherein the holding capacitor includes a first insulating film formed on a first polysilicon portion and a second polysilicon portion formed on the first insulating film, and the first polysilicon portion is connected to a fixed voltage.

6. A signal processing device according to claim 1, wherein the signal processing device is incorporated in an image pickup apparatus that includes photoelectric conversion elements for converting light into signal charges.

7. A solid state image pickup apparatus comprising:
pixels, each including a photoelectric conversion unit formed on a semiconductor substrate of a first conductivity type;
holding capacitors for holding output signals from the pixels;
transfer switches for transfeffing signals held in the holding capacitors to a common signal line;
a horizontal scanning circuit for sequentially reading the output signals held in the holding capacitors to a horizontal common signal line; and
a common read circuit for reading the output signals on the horizontal common signal line,
wherein a transistor constituting the horizontal scanning circuit is disposed in a semiconductor substrate of the first conductivity type, and
wherein the holding capacitors and the transfer switches are formed in a semiconductor layer that is disposed under the horizontal common signal line and that has a conductivity type opposite to the first conductivity type of the semiconductor substrate.

8. A solid state image pickup apparatus comprising:
pixels, each including a photoelectric conversion unit formed on a semiconductor substrate of a first conductivity type;
holding capacitors for holding output signals from the pixels;
transfer switches for transfeffing signals held in the holding capacitors to a common signal line;
a horizontal scanning circuit for sequentially reading the output signals held in the holding capacitors to a horizontal common signal line; and
a common read circuit for reading the output signals on the horizontal common signal line,
wherein a transistor constituting the horizontal scanning circuit is disposed in a semiconductor substrate of the first conductivity type, and
wherein the holding capacitors and the transfer switches are formed in a semiconductor layer that is disposed under the horizontal common signal line and that has a conductivity type opposite to the first conductivity type of the semiconductor substrate.

9. A signal processing device comprising:
a plurality of terminals connectable to a plurality of signal sources; and
a read circuit for converting signals input from the plurality of terminals into serial signals and outputting the serial signals, the read circuit including:
a holding capacitor connected to each of the plurality of terminals,
a transfer switch for transfeffing a signal held in the holding capacitor to a common signal line, and
a scanning circuit for driving the transfer switch,
wherein a transistor constituting the scanning circuit is disposed in a semiconductor substrate of a first conductivity type, and
wherein the holding capacitor and the transfer switch are formed in a semiconductor layer under the common signal line, in which the semiconductor layer has a conductivity type opposite to the first conductivity type of the semiconductor substrate, is connected to a ground, and shields the common signal line from a voltage change of the semiconductor substrate.

10. The signal processing device according to claim 1, wherein said shift register has a part formed on said semiconductor substrate.

11. The signal processing device according to claim 1 wherein a semiconductor layer under the common signal line is fixed at a potential through a path independent of a power source for the scanning circuit.

12. The image pickup apparatus according to claim 7, wherein a first conductive layer is disposed between a control electrode wiring line of the transfer switch and the common signal line.

13. The image pickup apparatus according to claim 12, wherein the semiconductor layer under the common signal line is capacitively coupled with the common signal line.

14. The image pickup apparatus according to claim 7, wherein the control electrode wiring line of the transfer switch is an impurity doped layer of the first conductivity type formed in the semiconductor layer under the common signal line.

15. The image pickup apparatus according to claim 7, wherein the holding capacitor includes a first insulating film formed on a first polysilicon portion and a second polysilicon portion formed on the first insulating film, and the first polysilicon portion is connected to a fixed voltage.

16. The image pickup apparatus according to claim 7, wherein a semiconductor layer under the common signal line is fixed at a potential through a path independent of a power source for the scanning circuit.

17. The image pickup apparatus according to claim 7, wherein the common read circuit is formed in the semiconductor layer.

18. The signal processing device according to claim 9, wherein a first conductive layer is disposed between a control electrode wiring line of the transfer switch and the common signal line.

19. The signal processing device according to claim 18, wherein the semiconductor layer under the common signal line is capacitively coupled with the common signal line.

20. The signal processing device according to claim 9, wherein the control electrode wiring line of the transfer switch is an impurity doped layer of the first conductivity type formed in the semiconductor layer under the common signal line.

21. The signal processing device according to claim 9, wherein the holding capacitor includes a first insulating film formed on a first polysilicon portion and a second polysilicon portion formed on the first insulating film, and the first polysilicon portion is connected to a fixed voltage.

22. A signal processing device according to claim 9, wherein the signal processing device is incorporated in an image pickup apparatus that includes photoelectric conversion elements for converting light into signal charge. type of said semiconductor substrate.

* * * * *